US011233389B1

(12) United States Patent
Chowdhury et al.

(10) Patent No.: US 11,233,389 B1
(45) Date of Patent: Jan. 25, 2022

(54) CONTROLLED THREE-POLE CLOSE FOR TRANSFORMERS

(71) Applicant: Schweitzer Engineering Laboratories, Inc., Pullman, WA (US)

(72) Inventors: Ritwik Chowdhury, Charlotte, NC (US); Gabriel Benmouyal, Boucherville (CA)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

(21) Appl. No.: 17/085,052

(22) Filed: Oct. 30, 2020

(51) Int. Cl.
*H02H 9/00* (2006.01)
*H02H 3/04* (2006.01)
*H02H 7/04* (2006.01)
*H01F 27/42* (2006.01)

(52) U.S. Cl.
CPC ............. *H02H 9/002* (2013.01); *H01F 27/42* (2013.01); *H02H 3/04* (2013.01); *H02H 7/04* (2013.01)

(58) Field of Classification Search
CPC .......... H02H 9/002; H02H 7/04; H01F 27/42
See application file for complete search history.

(56) References Cited

U.S. PATENT DOCUMENTS

| | | | |
|---|---|---|---|
| 2,209,810 A | 7/1940 | Cordray |
| 3,401,304 A | 9/1968 | Woodworth |
| 3,546,534 A | 12/1970 | Kotos |
| 3,558,984 A | 1/1971 | Smith |
| 4,322,768 A | 3/1982 | Maeda |
| 4,757,263 A | 7/1988 | Cummings |
| 4,914,382 A | 4/1990 | Douville |
| 5,367,426 A | 11/1994 | Schweitzer |
| 5,418,776 A | 5/1995 | Purkey |
| 5,430,599 A | 7/1995 | Charpentier |
| 5,627,415 A | 5/1997 | Charpentier |
| 5,671,112 A | 9/1997 | Hu |
| 5,703,745 A | 12/1997 | Roberts |
| 5,805,395 A | 9/1998 | Hu |
| 6,028,754 A | 2/2000 | Guzman |
| 6,256,592 B1 | 7/2001 | Roberts |
| 6,341,055 B1 | 1/2002 | Guzman-Casillas |
| 6,356,421 B1 | 3/2002 | Guzman-Casillas |
| 6,456,947 B1 | 9/2002 | Adamiak |
| 6,518,767 B1 | 2/2003 | Roberts |
| 6,571,182 B2 | 5/2003 | Adamiak |
| 6,590,397 B2 | 7/2003 | Roberts |
| 6,879,917 B2 | 4/2005 | Turner |
| 6,919,717 B2 | 7/2005 | Ghassemi |
| 7,345,863 B2 | 3/2008 | Fischer |
| 7,425,778 B2 | 9/2008 | Labuschagne |
| 7,469,190 B2 | 12/2008 | Bickel |
| 7,472,026 B2 | 12/2008 | Premerlani |
| 7,812,615 B2 | 10/2010 | Gajic |

(Continued)

*Primary Examiner* — Jared Fureman
*Assistant Examiner* — Christopher J Clark
(74) *Attorney, Agent, or Firm* — Bradley W. Schield

(57) ABSTRACT

An intelligent electronic device (IED) may obtain a residual flux of each phase of a transformer. The IED may determine a maximum difference (DIF) signal based on the residual flux and the prospective flux associated with potential close POWs of the corresponding phase. The TED may select a closing POW that results in a minimum DIF signal. The TED may send a signal to close a ganged switching device of the transformer at a time based on the selected closing POW.

20 Claims, 6 Drawing Sheets

(56) References Cited

U.S. PATENT DOCUMENTS

| | | | |
|---|---|---|---|
| 8,289,668 B2 | 10/2012 | Kasztenny | |
| 8,553,379 B2 | 10/2013 | Kasztenny | |
| 8,878,391 B2 | 11/2014 | Taylor | |
| 9,008,982 B2 | 4/2015 | Tziouvaras | |
| 9,379,535 B2 | 6/2016 | Taylor | |
| 10,418,201 B2 | 9/2019 | Haes | |
| 10,615,592 B2 * | 4/2020 | Fotrousi | H02H 9/002 |
| 2001/0012984 A1 | 8/2001 | Adamiak | |
| 2002/0101229 A1 | 8/2002 | Roberts | |
| 2007/0070565 A1 | 3/2007 | Benmouyal | |
| 2007/0252599 A1 | 11/2007 | Zhou et al. | |
| 2009/0059447 A1 | 3/2009 | Gajic | |
| 2009/0091867 A1 | 4/2009 | Guzman-Casillas | |
| 2010/0002348 A1 | 1/2010 | Donolo | |
| 2010/0141235 A1 * | 6/2010 | Koshiduka | H02H 9/002 |
| | | | 323/355 |
| 2013/0208386 A1 * | 8/2013 | Kai | H02H 7/0455 |
| | | | 361/115 |
| 2014/0002944 A1 | 1/2014 | Menezes | |
| 2014/0192443 A1 * | 7/2014 | Kosh | H01H 9/563 |
| | | | 361/35 |
| 2015/0179365 A1 | 6/2015 | Parapurath et al. | |
| 2017/0358404 A1 | 12/2017 | Talluri | |

\* cited by examiner

CONTROLLED THREE-POLE CLOSE FOR TRANSFORMERS

TECHNICAL FIELD

The present disclosure relates generally to transformer protection and, more particularly, to performing a controlled three-pole close of a circuit breaker on the transformer.

BRIEF DESCRIPTION OF THE DRAWINGS

Non-limiting and non-exhaustive embodiments of the disclosure are described herein, including various embodiments of the disclosure with reference to the figures listed below.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Electric power delivery systems include equipment, such as generators, power lines, and transformers, to provide electrical energy from sources to loads. Various intelligent electronic devices (IEDs) may be used in monitoring, control, and protection of the power delivery system. For example, IEDs may obtain voltage measurements and/or current measurements and send signals to circuit breakers to disconnect power lines or transformers to protect the electric power delivery system from exceeding designed operating conditions due to faults.

Some circuit breakers operate with individual pole switching which allows for each of the poles of the circuit breaker to be closed independent of the other poles. In other configurations, ganged switching may be used in which the three poles of the circuit breaker are closed together. When circuit breakers are opened, magnetic flux may remain on the transformer. Reconnecting the transformer to an energized power system may cause inrush currents that exceed the rated current value of the transformer. Such currents may cause stress or wear on the power system equipment connected to the transformer or the transformer itself, thereby reducing the reliability of the power system.

As explained below, a technique for performing a three-pole close of a ganged switching device of the transformer may be used to reduce current inrush. For example, an IED may obtain residual flux of each transformer limb. The residual flux may be used to determine a point-on-wave close time to send a close signal to the ganged switching device that reduces or minimizes current inrush from the transformer, thereby reducing stress on the power system.

Figure 1:
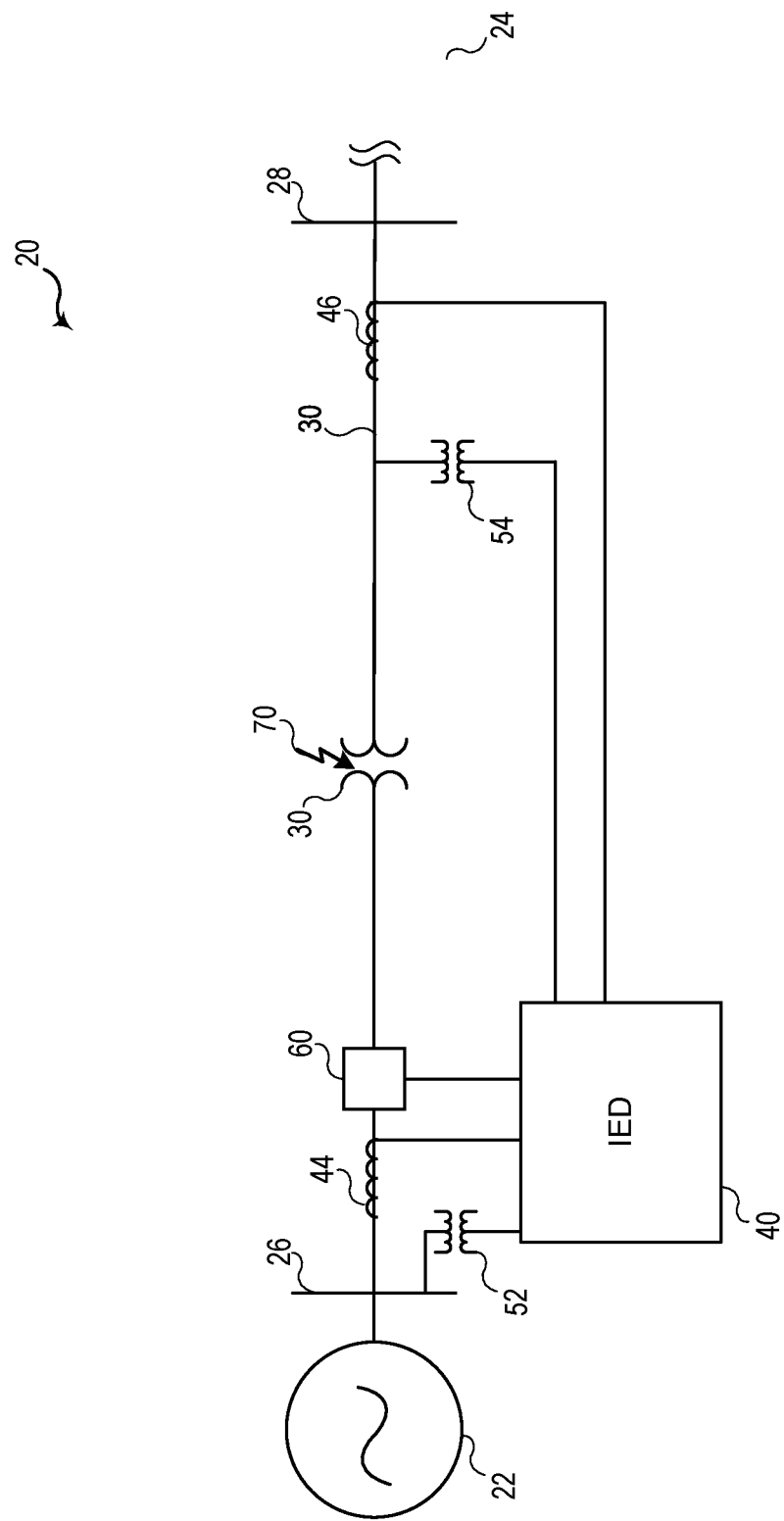
FIG. 1 is a one-line diagram of an electric power delivery system having an intelligent electronic device (IED) that determines residual flux and prospective flux to perform a controlled three-pole close of a circuit breaker (CB), in accordance with an embodiment.

FIG. 1 is a one-line diagram of a power system 20 that includes a power source 22, such as a distributed generator, that provides power to one or more loads. The power system 20 includes a transformer 30, such as a step-up or step-down transformer, that connects a local terminal 26 and a remote terminal 28. The terminals 26 and 28 may be buses in a transmission or distribution system supplied by power source 22. Although illustrated in single-line form for purposes of simplicity, power system 20 may be a multi-phase system, such as a three-phase electric power delivery system.

The transformer 30 is monitored by an IED 40, although additional IEDs (e.g., IEDs on high and low ends of the transformer 30) may also be utilized. As used herein, an IED (such as IED 40) may refer to any microprocessor-based device that monitors, controls, automates, and/or protects monitored equipment within the power system 20. Such devices may include, for example, remote terminal units, differential relays, transformer relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system comprising multiple IEDs. IED 40 may obtain electric power system information using current transformers (CTs) 44 and 46, and capacitor voltage transformers (VTs) 52 and 54. The IED 40 may detect fault events on the power line 30 using current and voltage signals from the CTs 44 and 46 and/or the VTs 52 and 54. In some embodiments, the IED 40 may communicate power system data with other IEDs via communication links.

The transformer 30 may be disconnect for various reasons. For example, a fault may occur on the power system 20 or the transformer 30 may be taken offline for testing among others. When a fault 70 occurs on the power line 30, the IED 40 may detect, for example, an overcurrent on the power line via the CTs 44 and 46.

The IED 40 may send a signal to a circuit breaker (CB) 60 to trip the circuit breaker, thereby disconnecting the transformer 30 from the power source 22. For example, the CB 60 may trip due to current measurements exceeding a threshold overcurrent, a threshold current-over-time, or a current differential between the current entering the transformer and current leaving the transformer due to some current feeding the fault, among others. Magnetic flux may remain on the transformer 30 due to voltages present on the transformer 30 when the transformer is disconnected.

Figure 2:
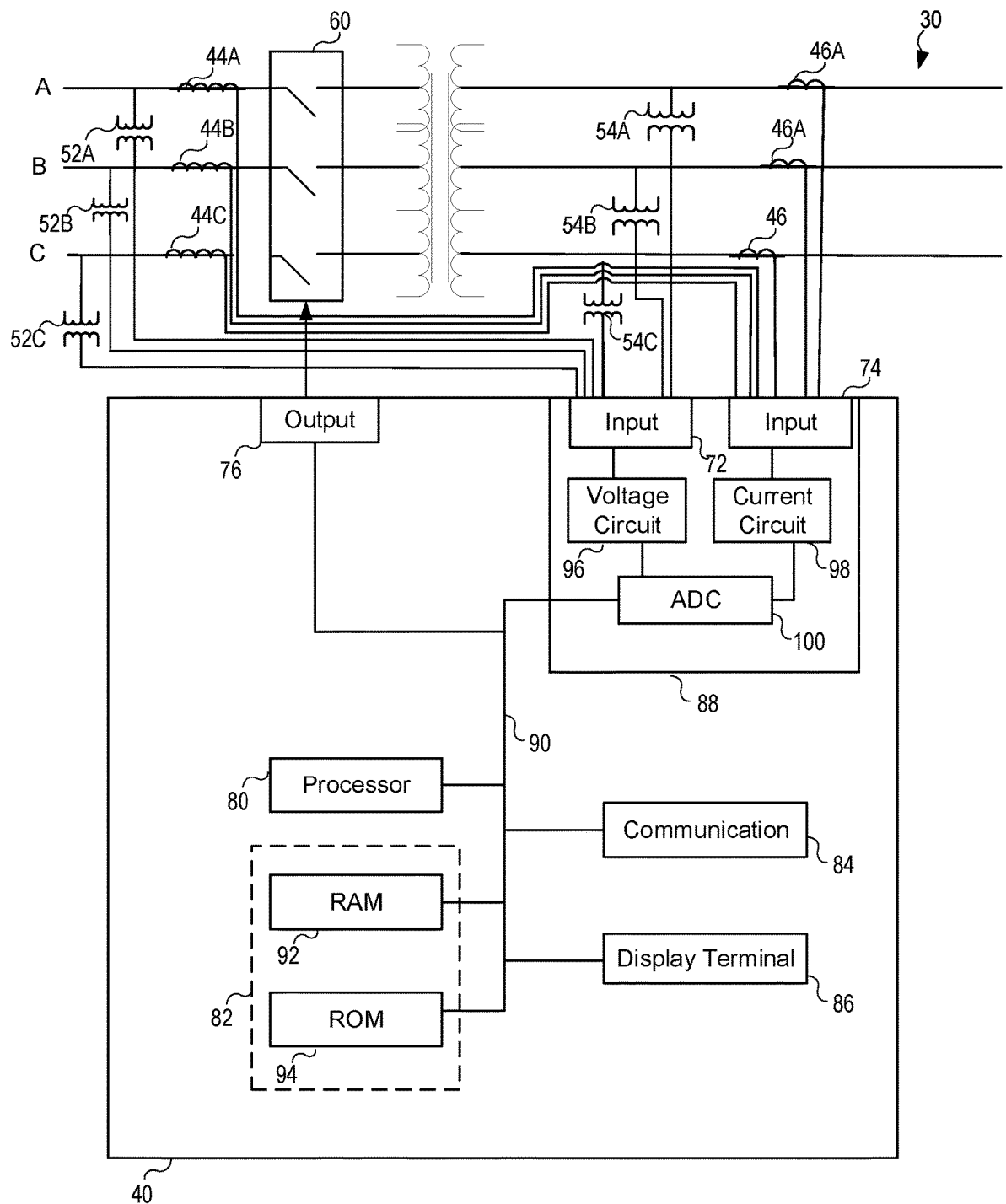
FIG. 2 is a block diagram of the IED of FIG. 1, in accordance with an embodiment.

FIG. 2 is a block diagram of the IED 40 connected to the CB 60 in a three-phase power system. The IED 40 may open the CB 60 due to an event on the transformer or the connections to the transformer 30. The IED 40 may determine magnetic flux on each phase A-C of the transformer 30. The IED 40 may be connected to CTs 44A-C and 46A-C and VTs 52A-C and 54A-c via inputs 72 and 74 to allow the IED 40 to receive signals of electrical conditions (e.g., voltage and current). The IED 40 may be connected to the CB 60 via the output 76 to allow the IED 40 to send a signal to the CB 60 to open or close the CB 60. The inputs 72 and 74 and output 76 may refer to ports, connectors, pins, and the like, used to connect the IED 40 to other devices. In some embodiments, the IED 40 may also include a CB on the opposite side of the transformer 30 to isolate the transformer 30 from receiving power bi-directionally.

The IED 40 may further include one or more processors 80, a computer-readable medium (e.g., memory 82), a communication interface 84, a display terminal 86, and detection circuitry 88 communicatively coupled to each other via one or more communication buses 90 The processor 80 may be embodied as a microprocessor, a general-purpose integrated circuit, an application specific integrated circuit (ASIC), a field programmable gate array (FPGA), and/or other programmable logic devices. It should be noted that the processor 80 and other related items in FIG. 2 (e.g., the memory 82) may be generally referred to herein as "processing circuitry." Furthermore, the processing circuitry may be a single contained processing module or may be incorporated wholly or partially within any of the other elements within the IED 40. It should be noted that FIG. 2 is merely one example of a particular implementation and is intended to illustrate the types of components that may be present in the IED 40.

In the IED 40 of FIG. 2, the processor 80 may be operably coupled with the memory 82 to perform various algorithms. Such programs or instructions executed by the processor 80 may be stored in any suitable article of manufacture that includes one or more tangible, computer-readable media at least collectively storing the instructions or routines, such as the random-access memory (RAM 92) and the read-only memory (ROM 94).

In the illustrated embodiment, the IED 40 includes detection circuitry 88 that detects various electrical conditions of the transformer 30 based on the input signals. The detection circuitry 88 may include a voltage conversion circuit 96 (e.g., transformer) and a circuit conversion circuit 98 (e.g., transformer) that transform the input signals to levels that may be sampled by the IED 40. The detection circuitry 88 may include analog-to-digital converter(s) 100 that sample the current and voltage signals and produce digital signals representative of measured current and measured voltage on the transformer 30 or to the connection limbs of the transformer 30, which may be transmitted to the processor 80. The IED 40 may compare the current and/or voltage to thresholds to detect faults and to disconnect the transformer 30 from the power source 22. For example, if current on one or more phases A-C exceeds a preset threshold and/or current-over-time exceeds a preset threshold, the processor 80 may detect a fault event and send a signal to open the CB 60.

In some embodiments, the IED 40 may include a communication interface 84, such as a fiber optic transceiver, to communicate with other IEDs. Further, the IED 40 may include a display terminal 86 and input structures (e.g., Universal-Serial-Bus (USB) ports, buttons, touchscreens, etc.) to allow operators to review events on the transformer 30, change settings, etc.

The IED 40 may receive a signal from an operator to open CB 60 to de-energize and take transformer 30 out-of-service. Subsequently, IED 40 may receive a signal from an operator to close CB 60 to re-energize and put transformer 30 back in service. During closing of the CB 60, there may be a flux difference between the limbs of transformer 30 due to the residual magnetic flux remaining on the disconnected, de-energized transformer 30 and the prospective flux associated with the voltage of the power line energized by the power source 22 upstream of the CB 60, which may cause a current inrush. Depending on the power system 20 and the extent of this flux difference, the current inrush may result in voltage transients that may reduce the power quality of the power system 20, reduce reliability of the system protecting power system 20, and increase stress and reduce life of the transformer 30.

As explained below, the amount of magnetic residual flux of each phase A-C of the transformer 30 may be estimated by the IED 40 using the voltage measurements received from the VTs 54A-C during de-energization of transformer 30. The magnetic flux of each of the phases A-C may then be used to obtain a closing point-on-wave (POW) at which to send a close signal to the CB 60 during the close process. The CB 60 may be a ganged switching device that opens and closes the three poles of the power line together based on a single open or close signal from the IED 40. To reduce stress to the equipment of the power system, the IED 40 may determine the closing POW to be a time that reduces or minimizes the current inrush from reconnecting the transformer 30 to the remaining power system 20.

Figure 3:
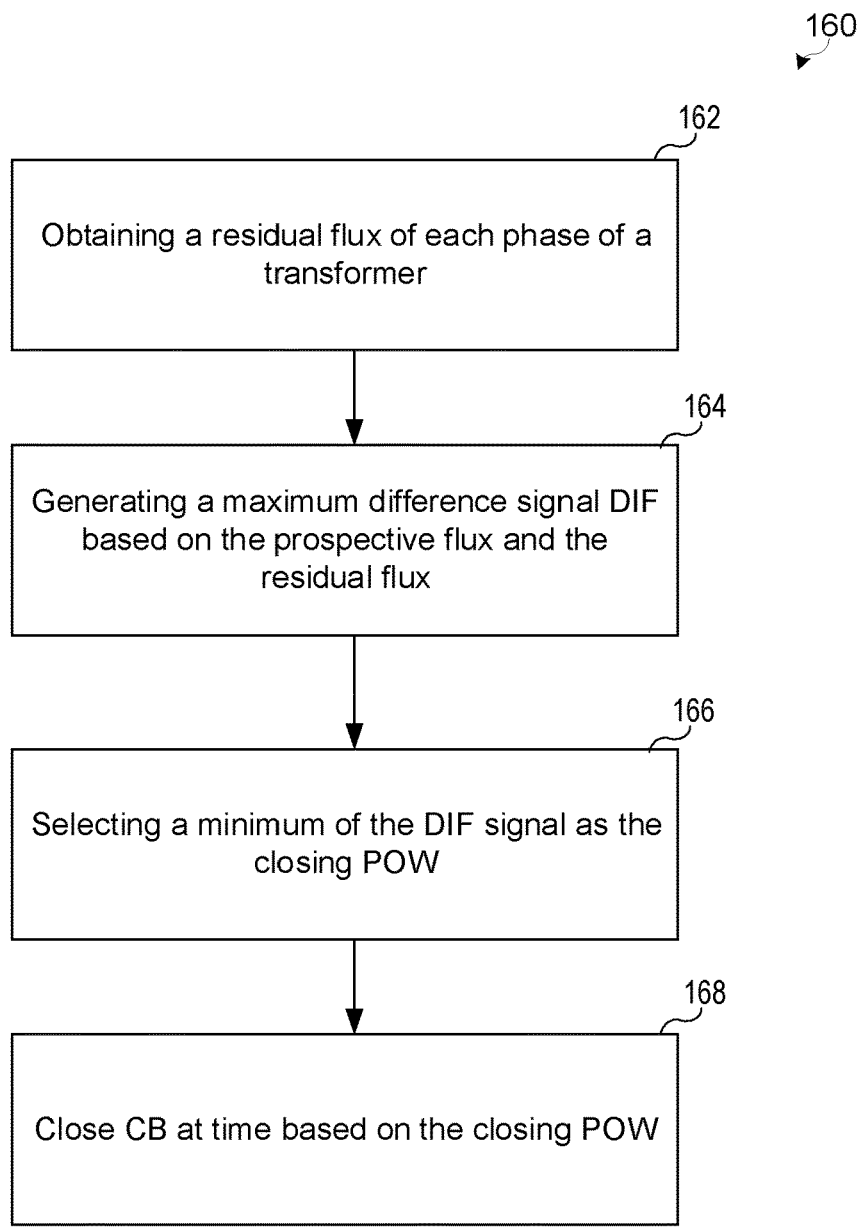
FIG. 3 is a flow chart of a process performed by the IED of FIG. 1 to perform the controlled three-pole close of the CB, in accordance with an embodiment.

FIG. 3 is a flow chart of a process 160 that may be performed by the IED 40 to reconnect the transformer 30 at a time that reduces or minimizes current inrush from the transformer 30. Instructions (e.g., code) may be stored in the memory 82 and executed by the processor 80 to cause the operations described in the process 160.

Prior to performing the process 160, the IED 40 may be commissioned to monitor the transformer 30. During commissioning, the IED may receive user settings input from an operator via the input structures. For example, the IED 40 may receive system phase rotation (PHROT), nominal frequency (NFREQ), delta-connection compensation angle (DCCA), and breaker parameters on each of the phases, such as TClose (close time in milliseconds) and TCarc (arc time in degrees).

During operation, the IED 40 may obtain a residual flux of each limb of the transformer 30 (block 162). For example, the IED 40 may obtain voltage measurements from each of the limbs (e.g., VTs 52A-C and 54A-C) of the transformer 30. The voltage measurements may be calculated in per-unit and integrated over a user-configurable period using the transformer voltage to obtain the residual flux of each phase in per unit. For example, the IED 40 may numerically integrate voltage samples obtained via the VTs 52A-C and 54A-C. In other embodiments, hardware of the IED 40 may be included that integrates the analog signal received by the VTs 52A-C and 54A-C.

The IED 40 may generate a maximum difference (DIF) signal between the prospective flux of each of the phases and the residual flux of the corresponding phase at various potential closing points-on-wave (POWs) of the bus voltage (block 164). The per-unit prospective flux associated with the bus voltages across each phase may be calculated as a function of POW, which ranges from 0 to 360 degrees via equations (1)-(5). The maximum difference is then calculated via equation (6) which uses the magnitudes of the quantities from (1)-(3) at various potential closing POWs.

$$A = -\cos(POW) \qquad \text{Eq. 1}$$

$$B = -\cos(POW - \alpha + GODLYB) \qquad \text{Eq. 2}$$

$$C = -\cos(POW + \alpha + GODLYC) \qquad \text{Eq. 3}$$

In the illustrated embodiment, if PHROT is set as 'ABC', then $\alpha = 120°$, otherwise $\alpha = -120°$. The GO delay for the B (GODLYB) and C (GODLYC) phases are shown via (4) and (5):

$$GODLYB = \left(\frac{TCloseB - TCloseA}{1000} * NFREQ * 360\right) - (TCarcB - TCarcA) \qquad \text{Eq. 4}$$

$$GODLYC = \left(\frac{TCloseC - TCloseA}{1000} * NFREQ * 360\right) - (TcarcC - TCarcA) \qquad \text{Eq. 5}$$

Where TClose, TCarc, and NFREQ are user inputs.

The DIF signal may be generated as:

$$DIF = \max(|A - \varphi_A|, |B - \varphi_B|, |C - \varphi_C|) \qquad \text{Eq. 6}$$

where A, B, and C are the A-phase, B-phase, and C-phase per-unit prospective flux associated with the bus voltages, respectively, at a given POW. $\varphi_A$, $\varphi_B$, and $\varphi_C$ are the A-phase, B-phase, and C-phase residual flux, respectively. The max function selects the maximum difference of the three differences for various potential closing POWs over a period.

Figure 4:
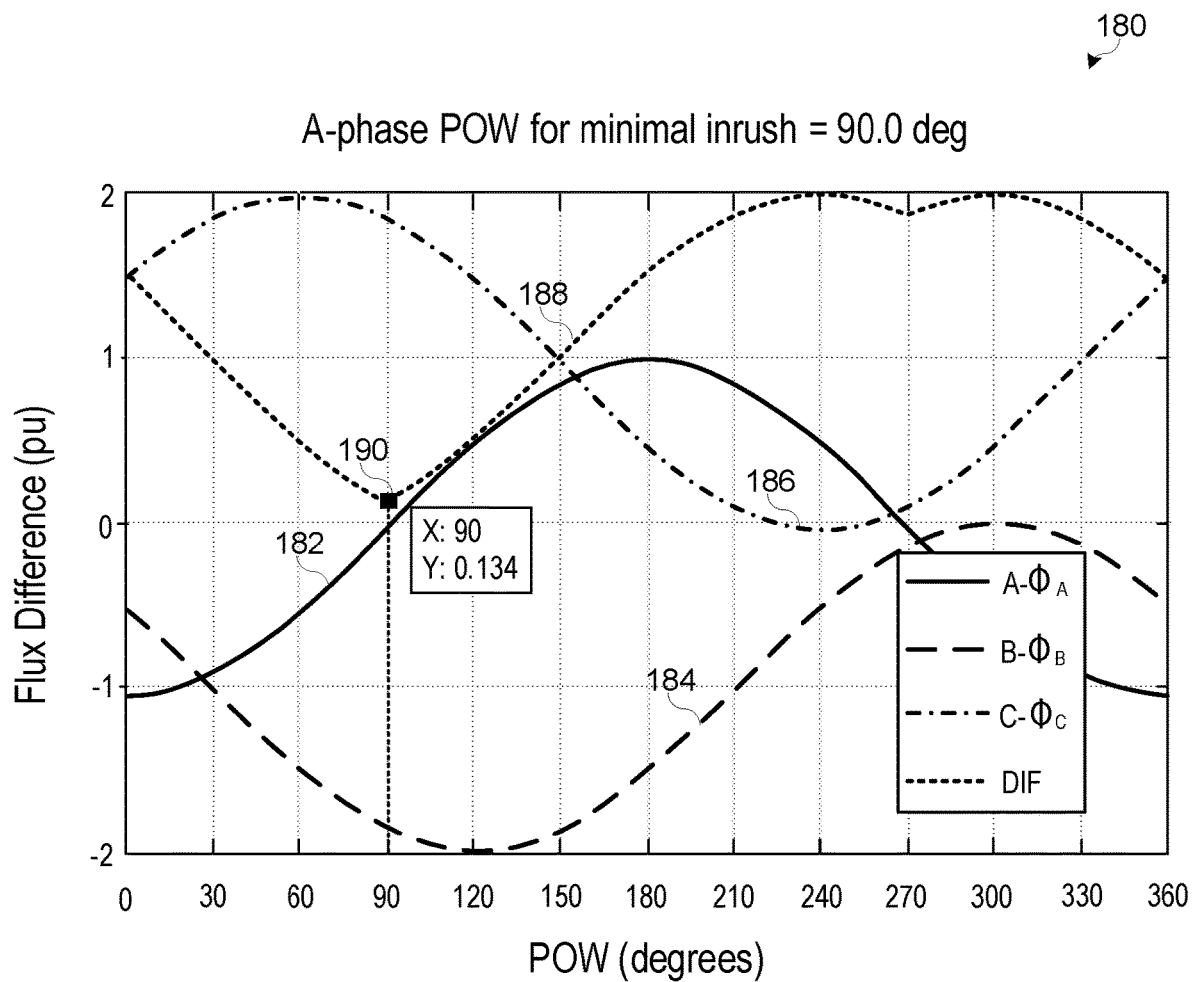
FIG. 4 is a plot of differences between prospective flux and residual flux obtained by the IED of FIG. 1, in accordance with an embodiment.

FIG. 4 is an example of a plot of differences ($|A-\varphi_A|$ 182, $|B-\varphi_B|$ 184, $\varphi_C|$ 186) between prospective flux and the respective residual flux for each phase. In the illustrated plot, the residual flux is [0 −1 1] per unit. The maximum of each of the differences may be selected to generate the DIF signal 188.

The IED 40 may then select, from the set of potential closing POWs, the POW at which the minimum of the DIF signal 188 occurs to use as the closing POW (block 166). In the illustrated plot, the POW that results in the minimum value 190 of the DIF signal 188 (POW=90 degrees) is then used to generate a closing POW TCpowA, TCpowB, and TCpowC via equations (7)-(9):

$$TCPOWA = POW + DCCA \qquad \text{Eq. 7}$$

$$TCPOWB = POW - \alpha + GODLYB + DCCA \qquad \text{Eq. 8}$$

$$TCPOWC = POW + \alpha + GODLYC + DCCA \qquad \text{Eq. 9}$$

The quantities TCpowA, TCpowB and TCpowC are the POWs with respect to the voltage zero crossings of the corresponding phases where the closing is executed. From (7)-(9), the TCpows refer to the same instant of time.

The IED 40 may then wait until the closing POW and then proceed to send a close signal to the ganged switching device of the transformer 30 to close the CB 60 at the selected closing POW (block 168). By closing the ganged switching device of the transformer 30 at a time that minimizes the maximum flux difference between the energized power system and the residual flux of the transformer 30, the IED 40 may reduce or minimize the current inrush required by transformer 30 from the equipment of the power system.

Figure 5:
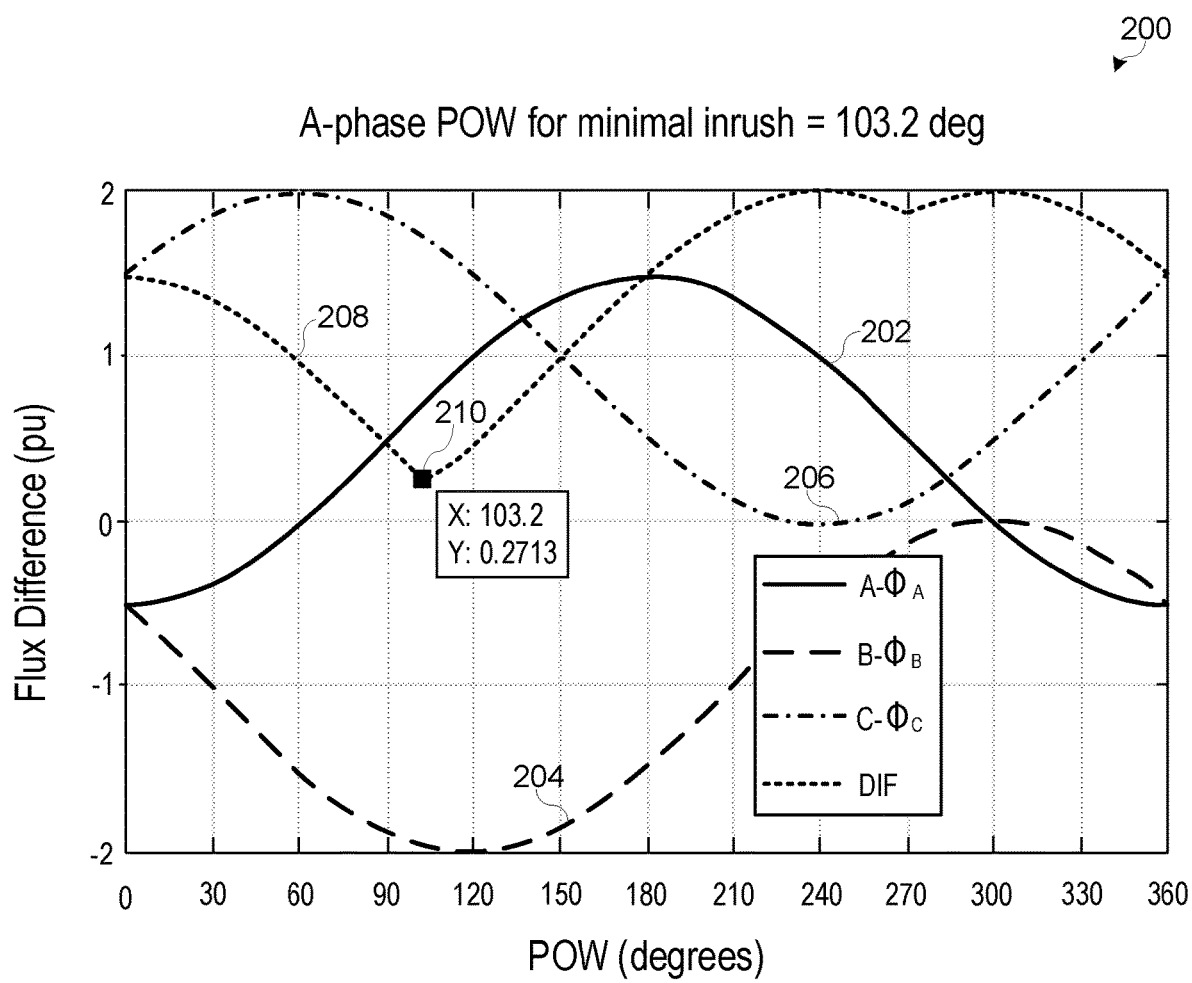
FIG. 5 is another plot of differences between prospective flux and residual flux obtained by the IED of FIG. 1, in accordance with an embodiment.
Figure 6:
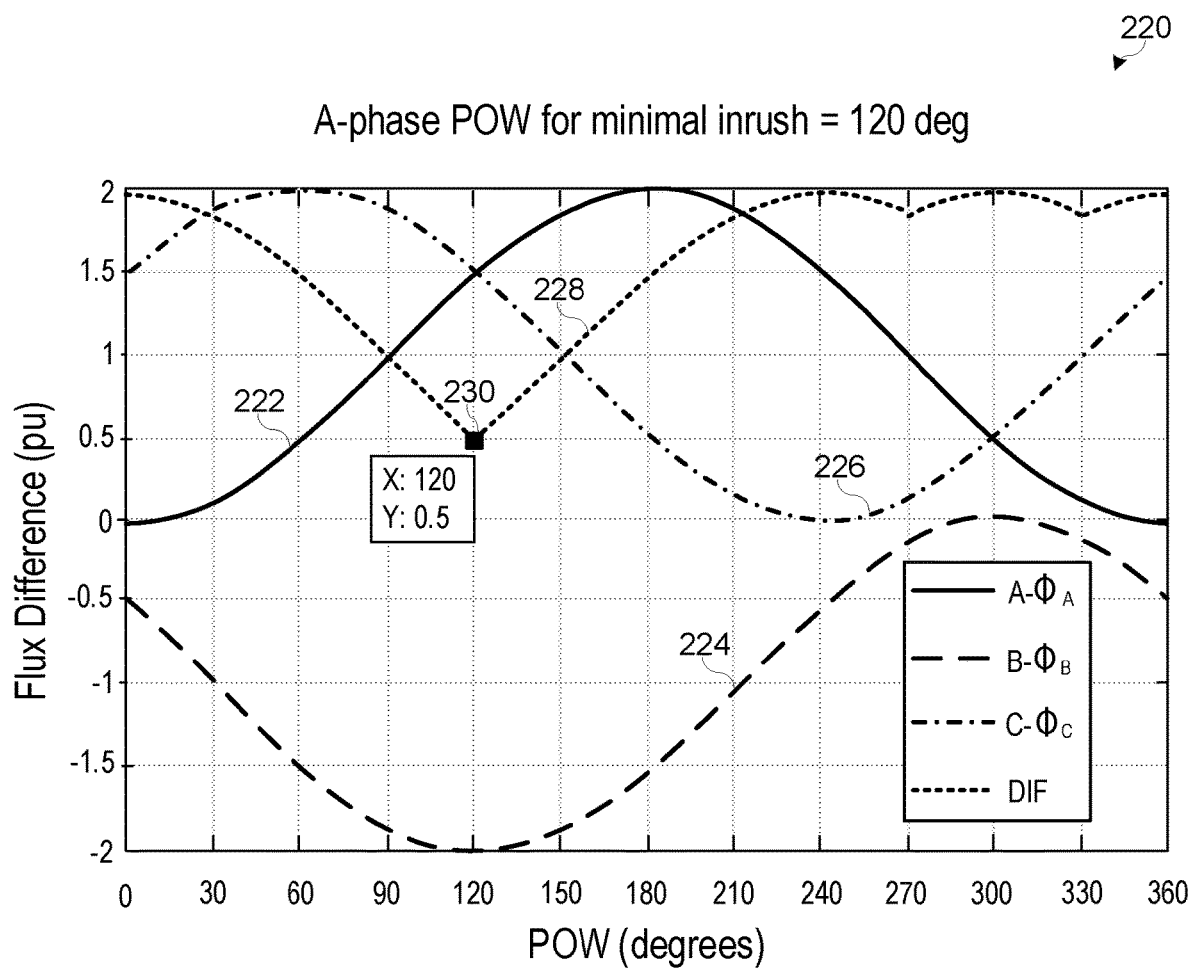
FIG. 6 is another plot of differences between prospective flux and residual flux obtained by the IED of FIG. 1, in accordance with an embodiment.

FIGS. 5 and 6 are additional examples of plots of differences ($|A-\varphi_A|$ 202 and 222, $|B-\varphi_B|$ 204 and 224, $|C-\varphi_C|$ 206 and 226) between prospective flux and the respective residual flux of each phase. The maximum of each of the differences is selected to generate the DIF signals 208 and 228. In the FIG. 5 plot, the residual flux is [0.5 −1 1] per unit, and in the FIG. 6 plot, the residual flux is [1 −1 1].

In each case, the IED 40 may select the POW 210 and 230 from the potential closing POWs, the time at which the minimum of the DIF signals 208 and 228 occurs to use as the closing POW (block 166). In the illustrated plot, the POW 210 and 230 that results in the minimum value 190 of the DIF signal (POW=103 degrees, POW=120 degrees) is then used to generate TCpowA, TCpowB, and TCpowC via equations (7)-(9). The IED 40 may then send the signal to the CB 60 to close the CB 60 at the time of the determined closing POW to minimize inrush current from the transformer 30.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An intelligent electronic device (IED) for controlling a ganged switching device of a transformer, comprising:
   a memory; and
   a processor operatively coupled to the memory, wherein the processor is configured to execute instructions stored on the memory to cause operations comprising:
      obtaining a residual flux of each phase of the transformer;
      determining a maximum difference (DIF) signal based on the residual flux of each phase and potential close point on wave (POW)s of each corresponding phase;
      selecting a closing POW that results in a minimum of the DIF signal;
      sending a signal to close a ganged switching device of the transformer at a time based on the selected closing POW.

2. The IED of claim 1, wherein the processor is configured to execute instructions stored on the memory to cause operations comprising aligning B and C phase per-unit prospective fluxes of the transformer to an A phase per-unit prospective flux of the transformer to account for system phase rotation.

3. The IED of claim 2, wherein the processor is configured to execute instructions stored on the memory to cause operations comprising accounting for ganged switching device operational delays of the B and C phases in aligning the B and C phase per-unit prospective fluxes.

4. The IED of claim 2, wherein the processor is configured to execute instructions stored on the memory to cause operations comprising obtaining a user setting of the system phase rotation that defines the B and C phases with respect to the A phase.

5. The IED of claim 1, wherein the DIF signal is defined as:

$$DIF=\max(|A-\varphi_A|,|B-\varphi_B|,|C-\varphi_C|)$$

where A, B, and C are the per-unit prospective flux at a given POW of the A phase, B phase, and C phase, respectively, and $\varphi_A$, $\varphi_B$, and $\varphi_C$ are the residual fluxes of the A phase, B phase, and C phase, respectively, and where max is a function taking the maximum of the 3 values.

6. The IED of claim 1, comprising a circuit breaker as the ganged switching device, wherein the processor is configured to execute instructions stored on the memory to cause operations comprising sending the signal to close the circuit breaker to reconnect the transformer to a power system.

7. A non-transitory, computer readable medium, comprising instructions configured to be executed by a processor to cause operations comprising:
   obtaining a residual flux of each phase of a transformer;
   determining a maximum difference (DIF) signal based on the residual flux of each phase and potential close point on wave (POW)s of each corresponding phase;
   selecting a closing POW that results in a minimum of the DIF signal;
   sending a signal to close a ganged switching device of the transformer at a time based on the selected closing POW.

8. The non-transitory, computer-readable medium of claim 7, wherein the instructions are configured to be executed by the processor to cause operations comprising obtaining the residual flux of each phase of the transformer by integrating the voltage over a period of the power system.

9. The non-transitory, computer-readable medium of claim 7, wherein the instructions are configured to be executed by the processor to cause operations comprising:
   receiving an input indicative of instructions to close the ganged switching device;
   after receiving the input, waiting until the time based on the selected closing POW; and
   sending the close signal to close the ganged switching device at the time.

10. The non-transitory, computer-readable medium of claim 9, wherein the input comprises a user input.

11. The non-transitory, computer-readable medium of claim 7, wherein the DIF signal is defined as:

$$DIF=\max(|A-\varphi_A|,|B-\varphi_B|,|C-\varphi_C|)$$

where A, B, and C are the per-unit prospective flux associated for the potential close POWs of A phase, B phase, and C phase, respectively, and $\varphi_A$, $\varphi_B$, and $\varphi_C$ are the residual fluxes of the A phase, B phase, and C phase, respectively, and where max is a function taking a maximum value of each of the parameters in the function.

12. The non-transitory, computer-readable medium of claim 7 wherein the instructions are configured to be executed by the processor to cause operations comprising:
   determining the DIF signal by:
      for each phase of the transformer, determining differences at a plurality of potential closing POWs between the residual flux and prospective flux at each respective potential closing POW;
      selecting a maximum difference value at each potential closing POW that is the maximum of the differences among the phases.

13. A method, comprising:
   obtaining a residual flux of each phase of a transformer;
   determining a maximum difference (DIF) signal based on the residual flux and the prospective flux at a plurality of potential close point on wave (POW)s of the corresponding phase;
   selecting a closing POW that results in a minimum of the DIF signal;
   sending a signal to close a ganged switching device of the transformer at a time based on the selected closing POW.

14. The method of claim 13, comprising obtaining the residual flux of each phase of the transformer by integrating the voltage over a period of the power system.

15. The method of claim 13, wherein the DIF signal is defined as:

$$DIF=\max(|A-\varphi_A|,|B-\varphi_B|,|C-\varphi_C|)$$

where A, B, and C are the prospective flux of the A phase, B phase, and C phase, respectively, and $\varphi_A$, $\varphi_B$, and $\varphi_C$ are the residual fluxes of the A phase, B phase, and C phase, respectively, and where max takes a maximum of $|A-\varphi_A|$, $|B-\varphi_B|$, and $|C-\varphi_C|$.

16. The method of claim 13, comprising:
   receiving ganged switching device parameters via user input; and
   accounting for ganged operational delays of the ganged switching device based at least in part on ganged switching device parameters.

17. The method of claim 16, wherein the ganged switching device parameters comprise a close time and an arc time.

18. The method of claim 13, comprising:
   receiving a delta-connection compensation angle (DCCA) via a user input; and
   accounting for the delta-connection compensation angle when selecting the closing POW.

19. The method of claim 13, comprising aligning B and C phase per-unit prospective fluxes of the transformer to an A phase per-unit prospective flux of the transformer to account for system phase rotation.

20. The method of claim 19, comprising accounting for ganged switching device operational delays of the B and C phases in aligning the B and C phase per-unit prospective fluxes.

* * * * *